United States Patent [19]

Ishikawa et al.

[11] Patent Number: 5,789,063
[45] Date of Patent: Aug. 4, 1998

[54] MAGNETIC RECORDING MEDIUM

[75] Inventors: Akira Ishikawa; Hidehiko Nakayama; Kazutaka Yamashita, all of Tochigi, Japan

[73] Assignee: Kao Corporation, Tokyo, Japan

[21] Appl. No.: 694,935

[22] Filed: Aug. 9, 1996

[30] Foreign Application Priority Data

Aug. 23, 1995 [JP] Japan ................................. 7-214280

[51] Int. Cl.⁶ ........................................................ G11B 5/706
[52] U.S. Cl. ........................... 428/141; 428/323; 428/328; 428/336; 428/694 BA; 428/394 TR
[58] Field of Search ...................... 428/694 BA, 394 LE, 428/694 BR, 336, 694 TR, 323, 328, 141; 252/62.57

[56] References Cited

U.S. PATENT DOCUMENTS

| | | | |
|---|---|---|---|
| 4,275,114 | 6/1981 | Schoenafinger et al. | 428/694 BP |
| 4,379,809 | 4/1983 | Matsufuji et al. | 428/694 BA |
| 4,444,850 | 4/1984 | Matsufuji et al. | 428/694 BN |
| 4,970,124 | 11/1990 | Oltean et al. | 428/694 BA |
| 5,260,132 | 11/1993 | Nakazumi et al. | 428/694 BA |
| 5,449,565 | 9/1995 | Aoki et al. | 428/694 BA |

*Primary Examiner*—Christopher D. Rodee
*Attorney, Agent, or Firm*—Oblon, Spivak, McClelland, Maier & Neustadt, P.C.

[57] ABSTRACT

A magnetic recording medium comprising a support and a magnetic layer comprising a ferromagnetic metal powder and a binder formed on said support, wherein the magnetic layer has a surface roughness of 10 nm or smaller, a coercive force of 1,580 Oe or greater and a decreasing ratio ΔBs of a saturation flux density (a change rate of saturation flux density Bs' of the magnetic layer realized after the magnetic recording medium has been allowed to stand in an environment, the temperature of which is 60° C. and the relative humidity of which is 90% for 30 days, as compared with saturation flux density Bs of the magnetic layer before the magnetic recording medium is allowed to stand, the change rate being a value expressed by an equation ΔBs= (1−Bs'/Bs)×100) of 10% or lower.

12 Claims, 1 Drawing Sheet

MAGNETIC RECORDING MEDIUM

FIELD OF THE INVENTION

The present invention relates to a magnetic recording medium exhibiting excellent electromagnetic characteristics and satisfactory reservation stability.

BACKGROUND OF THE INVENTION

Hitherto, magnetic recording mediums have been employed widely in a variety of forms, such as tapes, disks, drums and sheets. The magnetic recording medium of the foregoing type has been usually manufactured by applying a magnetic coating composition mainly composed of a magnetic powder and a binder to the surfaces of a support made of a polyester film, a polyaramide film or the like.

In recent years, the requirement for high recording density has resulted in the conventional magnetic recording mediums being unsatisfactory in electromagnetic characteristics that can be realized in the required high recording density state. Further, another problem of unsatisfactory storage stability arises such that the electromagnetic characteristics deteriorate during storage.

To solve the foregoing problems, a magnetic recording medium has been disclosed in JP-A-4-79046 (the term "JP-A" as used herein means an "unexamined published Japanese patent application") in which the residual quantity of a solvent and the surface roughness of the magnetic layer are specified. However, the magnetic recording medium disclosed as described above could not sufficiently solve the foregoing problems. Thus, there arises a requirement for a magnetic recording medium having further improved electromagnetic characteristics and storage stability.

SUMMARY OF THE INVENTION

Accordingly, an object of the present invention is to provide a magnetic recording medium exhibiting excellent electromagnetic characteristics and satisfactory storage stability.

As a result of energetic investigation performed by the inventors of the present invention to solve the foregoing problems, it has been found out that the object of the present invention has been achieved by a magnetic recording medium, comprising a support and a magnetic layer comprising a ferromagnetic metal powder and a binder, and having a surface roughness, coercive force and a decreasing ratio of the saturation flux density which are within a specific range.

According to one aspect of the present invention, there is provided a magnetic recording medium comprising a support and a magnetic layer comprising a ferromagnetic metal powder and a binder formed on the support, wherein the magnetic layer has a surface roughness of 10 nm or smaller, a coercive force of more than 1,580 Oe and a decreasing ratio $\Delta Bs$ of a saturation flux density (a change rate of saturation flux density $Bs'$ of the magnetic layer realized after the magnetic recording medium has been allowed to stand in an environment, the temperature of which is 60° C. and the relative humidity of which is 90% for 30 days, as compared with saturation flux density $Bs$ of the magnetic layer before the magnetic recording medium is allowed to stand, the change rate being a value expressed by an equation $\Delta Bs = (1 - Bs'/Bs) \times 100$) of 10% or lower.

Other objects, features and advantages of the invention will be evident from the following detailed description of the preferred embodiments described in conjunction with the attached drawings.

DETAILED DESCRIPTION OF THE INVENTION

Figure 1:
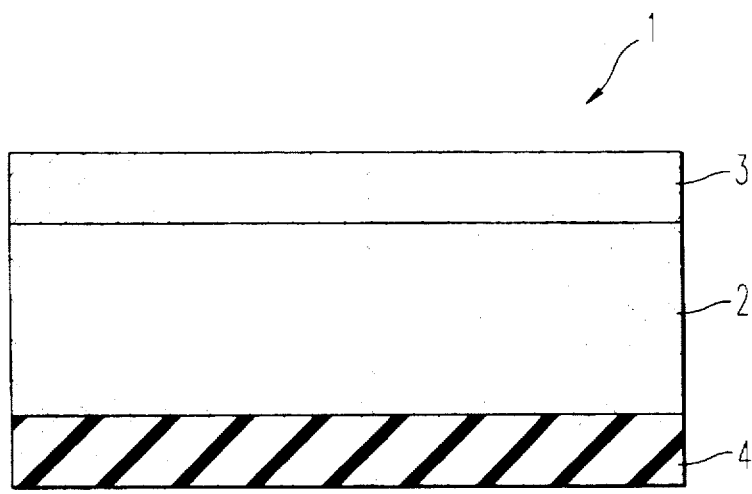
FIG. 1 is a schematic cross sectional view showing the structure of a magnetic recording medium according to the present invention.

A magnetic recording medium according to the present invention is now described in details.

Referring to FIG. 1, a preferred embodiment of the structure of the magnetic recording medium according to the present invention is explained below.

A magnetic recording medium 1 shown in FIG. 1 comprises a support 2 and a magnetic layer 3 formed on the support 2. A back coat layer 4 is formed on the opposite side of the support 2, if necessary.

In addition to the support, the magnetic layer and the back coat layer, the magnetic recording medium according to the present invention may have a non-magnetic layer between the magnetic layer and the support, if necessary. Further, the magnetic recording medium may be composed of a plurality of magnetic layers. Moreover, other layers such as a primer layer formed between the support and the magnetic layer or the back coat layer and another magnetic layer for recording servo signals corresponding to a hard system using long wavelength signals may be provided.

As the support to be employed in the magnetic recording medium according to the present invention, either of a magnetic support or a non-magnetic support may be employed. In particular, it is preferable that the non-magnetic support be employed.

As the non-magnetic support, any of well-known support may be employed without any limitation. Specifically, a flexible film or a disk composed of a polymer resin; and a film, a disk, a card or the like may be employed which is made of non-magnetic metal such as Cu, Al or Zn, glass, porcelain or ceramic such as earthenware.

Examples of the polymer resin for forming the flexible film or the disk include polyesters, such as polyethylene terephthalate, polybutylene terephthalate, polyethylene naphthalate, polycyclohexylene dimethylene terephthalate and polyethylene bisphenoxycarboxylate; polyolefin, such as polyethylene and polypropylene; cellulose derivatives, such as cellulose acetate butyrate and cellulose acetate propionate; vinyl resins, such as polyvinyl chloride and polyvinylidene chloride; polyamide; polyimide; polycarbonate; polysulfone; polyether ether ketone and polyurethane. The above polymer resins may be employed solely or in combinations.

It is preferable that the magnetic recording medium according to the present invention has the back coat layer on the opposite side of the support thereof. The back coat layer may be formed by using a well-known back coating composition without particular limitations.

The magnetic layer to be formed on the support of the magnetic recording medium according to the present invention is a magnetic layer comprising a ferromagnetic metal powder and a binder, the magnetic layer being formed by applying a magnetic coating composition to the support.

It is preferable that the magnetic coating composition comprises as main components a ferromagnetic metal powder, a binder and a solvent.

The ferromagnetic metal powder is exemplified by ferromagnetic metal powder, the main component of which is iron. To achieve a specified coercive force range of the magnetic layer according to the present invention, it is preferable that the coercive force of the ferromagnetic metal powder be 1,550 Oe or greater, more preferably 1580 Oe or greater, and most preferably 1,600 Oe to 2,400 Oe.

It is preferable that the saturation magnetization of the ferromagnetic metal powder be 100 emu/g to 180 emu/g, more preferably 110 emu/g to 160 emu/g. If the saturation magnetization of the ferromagnetic metal powder is less than the lower limit of the foregoing range, the charging ratio of the magnetic powder is lowered excessively and thereby the output is decreased. If the saturation magnetization is more than the upper limit of the foregoing range, there arises a necessity of reducing amount of the binder. Thus, the interaction among magnetic powders is intensified excessively, as a result, the magnetic powder is in an aggregation state. Therefore, a required output can be obtained with difficulty. Therefore, it is preferable that the saturation magnetization is within the foregoing range.

It is preferable that the saturation flux density of the ferromagnetic metal powder be 2,500 gauss to 4,500 gauss, more preferably 2,800 gauss to 4,000 gauss.

The metal content of the metal component in the ferromagnetic metal powder is 50 wt % or higher. Moreover, Fe atom content in the metal component is 60 wt % or higher. In particular, it is preferable that ferromagnetic metal powder be employed which contains 0.8 to 20 parts by weight of one or more types of the elements in group IIIa including lanthanoids per 100 parts by weight of Fe atom. The elements in group IIIa are exemplified by Sc, Y and lanthanoids such as La, Nd, Sm, Dy, Gd, Ce, Pr and Tb.

Specific examples of the ferromagnetic metal powder include Fe—Co, Fe—Ni, Fe—Al, Fe—Ni—Al, Fe—Co—Ni, Fe—Ni—Al—Zn, Fe—Al—Si, Fe—Co—Y, Fe—Ni—Y, Fe—Al—Y, Fe—Ni—Al—Y, Fe—Co—Ni—Y, Fe—Ni—Al—Zn—Y, Fe—Al—Si—Y, Fe—Co—La, Fe—Ni—La, Fe—Al—La, Fe—Ni—Al—La, Fe—Co—Ni—La, Fe—Ni—Al—Zn—La, Fe—Al—Si—La, Fe—Co—Al—Y, Fe—Co—Al—La and Fe—Co—Al—Gd.

In the foregoing case, it is preferable that the content of Al be 1 wt % to 10 wt %, more preferably 2 wt % to 8 wt %, and most preferably 2 wt % to 7 wt %. It is preferable that the content of Co be 0 wt % to 50 wt %, preferably 0 wt % to 40 wt %, and most preferably 0 wt % to 30 wt %.

It is preferable that the shape of the ferromagnetic metal powder be an acicular shape or a spindle shape. It is preferable that the length in the long axis be 0.05 μm to 0.30 μm, more preferably 0.05 μm to 0.25 μm, and most preferably 0.05 μm to 0.22 μm. A preferred acicular ratio is 3 to 20, and a preferred particle size analyzed by X rays is 130 Å to 250 Å, more preferably 130 Å to 200 Å, most preferably 130 Å to 190 Å.

The ferromagnetic metal powder in the magnetic coating composition forming the magnetic layer may contain rare earth elements and transition metal elements, if necessary.

In the present invention, the ferromagnetic metal powder may be subjected to surface treatment to improve dispersion properties thereof. The surface treatment can be performed by a method disclosed in, for example, Academic Press, *Characterization of Powder Surfaces*. Specifically, a method may be employed in which the surface of the ferromagnetic metal powder is covered with an inorganic oxide. Examples of the inorganic oxide include $Al_2O_3$, $SiO_2$, $TiO_2$, $ZrO_2$, $SnO_2$, $Sb_2O_3$ and $ZnO$. The inorganic oxide may be used solely or in combination.

It is preferable that the ferromagnetic metal powder be subjected to the foregoing surface treatment to form a surface-treated layer.

The surface treatment may be any one of the following organic treatments such as treatment with silane coupling agent, treatment with titanium coupling agent and treatment with aluminum coupling agent, as well as the foregoing method.

It is preferable that the content of water in the ferromagnetic metal powder be 0.4 wt % to 1.6 wt %, more preferably 0.5 wt % to 1.4 wt %. If the content of water is lower than 0.4 wt %, the manufacturing process encounters a difficulty, handling during adjustment of the magnetic coating composition cannot easily be performed, the probability of fire setting is raised, and the dispersion properties of the magnetic coating composition cannot satisfactorily be improved. If the content of water is higher than 1.6 wt %, the probability of fire setting can be lowered. However, the dispersion properties of the magnetic coating composition and the physical properties of the obtained magnetic layer are sometimes adversely affected.

The binder used in the magnetic coating composition for forming a magnetic layer may be made of a material exemplified by a thermal plastic resin, a thermosetting resin and a reaction type resin. The resin may be employed solely or in combination.

Specific examples of the binder include a vinyl chloride resin, polyester, polyurethane, nitrocellulose and an epoxy resin. Moreover, resins disclosed in page 2 of JP-A-57-162128 may be employed. The binder may contain a polar group to improve dispersion properties and so forth.

It is preferable that the amount of the binder used be about 5 to about 100 parts by weight per 100 parts by weight of the ferromagnetic metal powder, more preferably 5 to 70 parts by weight.

Examples of the solvent to be contained in the magnetic coating composition for forming the magnetic layer include ketone solvents, ester solvents, ether solvents, aromatic hydrocarbon solvents and chlorinated hydrocarbon solvents. Specifically, solvents may be employed that are disclosed in page 4 of JP-A-57-162128.

It is preferable that the amount of the solvent be 80 to 50 parts by weight per 100 parts by weight of the ferromagnetic metal powder, more preferably 100 to 350 parts by weight.

Additives, which have been usually employed in the magnetic recording medium, may be added to the magnetic coating composition according to the present invention, if necessary, examples of the usual additives include a dispersant, a lubricant, an abrasive, an antistatic agent, a rust preventive agent, a mildewproofing agent and a hardening agent. Specifically, additives are exemplified by those disclosed on in page 2 to page 3 of JP-A-57-162128.

The foregoing magnetic coating composition may be prepared by, for example, a method comprising the steps of introducing, together with a portion of the solvent, the ferromagnetic metal powder and the binder into a Nauta-mixer or the like so as to be previously pre-mixed to obtain a mixture; kneading the obtained mixture with a continuous pressure kneader or the like; diluting the kneaded mixture with a portion of the solvent; dispersing the diluted mixture by using a sandmill or the like; mixing the additives, such as the lubricant, with the dispersed mixture; filtering the mixture; and then mixing the hardening agent such as polyisocyanate and residual portion of the solvent.

It is preferable that the thickness of the magnetic layer be 0.05 μm 3.0 μm, more preferably 0.1 μm to 2.5 μm. If the thickness of the magnetic layer is less than 0.05 μm, the magnetic layer cannot easily be formed by applying the magnetic coating composition. If the thickness is larger than 3.0 μm, the magnetic layer is unsuitable for use in high density recording operation.

Therefore, the magnetic layer of the magnetic recording medium according to the present invention has surface roughness (Ra) of preferably 10 nm or smaller, more preferably 1 nm to 8 nm, a coercive force of preferably more than 1,580 Oe, more preferably 1,600 Oe to 2,400 Oe, most preferably 1,600 Oe to 2,300 Oe, and a decreasing ratio ΔBs of the saturation flux density of preferably 10% or lower, more preferably 0.05% to 8%.

If the surface roughness of the magnetic layer is larger than 10 nm, an excessively large spacing loss takes place and, therefore, satisfactory electromagnetic characteristics cannot be obtained.

If the coercive force of the magnetic layer is 1580 Oe or less, the output characteristic in a high frequency region is deteriorated. Also the resolving power expressed by the ratio of the output in the high frequency region and that in the lower frequency region is affected adversely.

If the decreasing ratio ΔBs of the saturation flux density is higher than 10%, the storage characteristic for a long time is deteriorated. Thus, the output characteristic and the error rate are excessively affected adversely.

In the present invention, ΔBs is a change rate of saturation flux density Bs' realized after leaving the magnetic layer in an environment, the temperature of which is 60° C. and the relative humidity of which is 90%, for 30 days as compared with saturation flux density Bs measured before the magnetic layer is left, ΔBs being a value obtained from an equation ΔBs=(1−Bs'/Bs)×100. The foregoing value ΔBs is a value realized after the magnetic recording medium, immediately after manufactured, has been left in the foregoing conditions.

The magnetic recording medium according to the present invention, which is suitable to form a magnetic recording tape, such as the 8 mm video tape, DAT tape, DDS tape and Data storage tape is also employed to manufacture a magnetic recording medium, such as a floppy disk.

A method of manufacturing the magnetic recording medium according to the present invention will schematically be described.

Initially, the magnetic coating composition for forming the magnetic layer is applied to the support in such a manner that the dry thickness of the magnetic layer is the foregoing thickness so that the coated film of the magnetic layer is formed.

Then, the formed film is subjected to an orientation treatment in the magnetic field and a drying process. Then, the intermediate product is wound. Then, the product is subjected to a calender process, and then a back coat layer is formed thereof, if necessary. If a magnetic tape is intended to be obtained, an aging process is performed at 40° C. to 70° C. for 6 to 168 hours, if necessary. Then, the intermediate product is cut to have a required width.

The orientation treatment in the magnetic field is performed before the magnetic coating composition is dried. When the magnetic recording medium according to the present invention is a magnetic recording tape, the process is performed by a method in which a magnetic field of preferably about 500 Oe or greater, more preferably about 1,000 Oe to 10,000 Oe, is applied in parallel to the surface on which the magnetic coating composition has been applied; or a method in which the intermediate product is allowed to pass through a solenoid having a magnetic field of 1,000 Oe to 10,000 Oe in a state where the magnetic coating composition is in a wet state.

The drying process is performed by, for example, supplying a heated gas. By controlling the temperature of the gas and the quantity of the gas to be supplied, the extent of dryness of the coated film can be controlled.

The calender process can be performed by a super calender method in which the intermediate product is allowed to pass between two rolls, such as a metal roll and a cotton roll or a synthetic resin roll, or between two metal rolls.

The back coat layer formed if necessary is provided on the opposite side of the support (the surface opposite to the surface on which the magnetic layer has been formed), the back coat layer being usually obtained by applying a usual back coating composition to the support.

When the magnetic recording medium according to the present invention is manufactured, the surface of the magnetic layer may be subjected to a finishing process, such as a grinding process and a cleaning process.

The magnetic recording medium according to the present invention is only required to comprise the magnetic layer having the surface roughness (Ra) of 10 nm or smaller, the coercive force of more than 1,580 Oe and the decreasing ratio ΔBs of the saturation flux density of 10% or lower. However, the surface roughness, the coercive force and ΔBs may be adjusted within the foregoing range.

The surface roughness may be adjusted arbitrarily by selecting and adjusting the composition of the solvent, the drying conditions (the quantity of air, the temperature and the like) and the calender conditions (the speed, the pressure and the temperature of the rolls and the like).

It is preferable that the composition of the solvent contains at least one type of solvent, such as cyclohexane, having a high boiling point.

It is preferable that the drying conditions are such that the temperature of the hot air is 30° C. to 120° C., the wind velocity of 10 m/sec to 35 m/sec and the drying time is 1 second to 60 seconds.

It is preferable that the calender conditions are such that the calender speed is 30 m/s to 800 m/s, the pressure is 100 kg/cm to 500 kg/cm and the temperature of the rolls is 60° C. to 140° C.

The surface roughness (Ra) is measured by a method described in the examples below.

The coercive force of the magnetic layer can arbitrarily be adjusted by varying the type and quantity of the ferromagnetic metal powder. For example, ferromagnetic metal powder having a coercive force of 1,550 Oe or greater may be employed to adjust the coercive force of the magnetic layer.

The decreasing ratio ΔBs of the saturation flux density of the magnetic layer can arbitrarily be adjusted by varying the composition of metal elements contained in the ferromagnetic metal powder, by adjusting the thickness and the denseness of the surface oxide layer formed by an oxidation process in a case where the surface-treated layer is provided for the ferromagnetic metal powder, by adjusting the dispersion properties of the magnetic coating composition or by selecting the binder and the additives. For example, ferromagnetic metal powder, which can be manufactured by adding Co or the like as the additive element, may be employed to adjust ΔBs.

The methods of adjusting the thickness and the denseness of the surface oxide layer and dispersing the magnetic coating is described below.

A gas phase method is now described. As another method, a liquid phase method has been known.

Adjustment of the Thickness of the Surface Oxide Layer

The thickness of the surface oxide layer can be adjusted by any of the following methods:

(1) The thickness can be enlarged by maintaining a high stabilizing temperature in a stabilizing process which is usually performed after the reduction process;

(2) The density of $O_2$ to be determined in the stabilizing process is set to be a somewhat high level so as to be stabilized; or (3) Water vapor may be added during the stabilizing process. The density of water vapor is adjusted to adjust the thickness of the surface oxide layer.

Adjustment of Denseness of Surface Oxide Layer

In the initial stage of the stabilizing process, the portion in the vicinity of the surface is oxidized with a low density of $O_2$ and at a moderate stabilizing temperature. At the second step, the stabilizing temperature is raised and adjusted to obtain a required saturation magnetization ($\sigma s$). The saturation magnetization can be adjusted by, for example, the following method:

In the stabilizing process, the density of $O_2$ is measured through the process to monitor the total quantity of $O_2$. In accordance with the quantity of $O_2$ added to a system with respect to Fe, the amount of the oxide film is calculated on the assumption that the overall quantity of $O_2$ has reacted with Fe. Thus, the quantity of $O_2$, which is required to obtain a predetermined saturation magnetization ($\sigma s$), can be detected.

Adjustment by Using Additives

By arbitrarily adding a substance having a rust proofing effect or a substance for realizing oxidation resistance, the adjustment can be performed.

EXAMPLES

Examples and comparative examples of the present invention is described below. Note that the present invention is not limited to the description below.

Example 1

Coating Composition A having the following composition was used and back coating composition having the following composition was used as the back coating composition, so that a magnetic recording tape was manufactured by the following method for manufacturing the magnetic recording medium. Thus, a magnetic recording tape was obtained which was the magnetic recording medium having a magnetic layer formed by the magnetic coating composition shown in Table 1.

The content of water in the ferromagnetic metal powder to be contained in the magnetic recording tape was measured by a method described later. The results are shown in Table 1 below.

The coercive force and the saturation flux density of the magnetic layer formed by using Magnetic Coating Composition A were measured by the method to be described later. As a result, the coercive force and the saturation flux density of the magnetic layer formed by using Magnetic Coating Composition A are shown in Table 1.

| | Parts by Weight |
|---|---|
| Magnetic Coating Composition A | |
| Ferromagnetic Metal Powder Mainly Composed of Fe | 100 |
| Fe:Al:Y:Co:Ca (a surface oxide layer was provided in which 1.8 parts by weight of Y per 100 parts by weight of Fe was contained as the additive element, the coercive force was 1,580 Oe, the saturation magnetization was 125 emu/g, the mean length in the long axis was 0.25 μm, the acicular ratio was 13, the content of water was 0.9%, the thickness was 30 Å to 50 Å and the mean thickness was 40 Å) | |
| Alumina (mean particle size: 0.3 μm) | 8 |
| Carbon Black (Mean Primary Particle Size: 48 nm) | 0.6 |
| MR104 (trade name of Nippon Zeon Co., Ltd., which was a vinyl resin containing a sulfonic group) | 10 |
| UR8300 (trade name of Toyobo Co., Ltd., which was a polyurethane resin containing a sulfonic group) | 7 |
| Butyl Stearate | 1.6 |
| Palmitic acid | 1.9 |
| Coronate HX (trade name of Nippon Polyurethane Industry Co., Ltd., which was a polyisocyanate compound) | 4.3 |
| Methylethylketone | 90 |
| Toluene | 100 |
| Cyclohexane | 60 |
| Composition of Back Coating Composition | |
| Carbon Black (mean primary particle size: 0.028 μm) | 32 |
| Carbon Black (mean primary particle size: 0.062 μm) | 8 |
| Nippollan 2301 (trade name of polyurethane manufactured by Nippon Polyurethane Industry Co., Ltd.) | 50 |
| Nitrocellulose (manufactured Hercules Powder Co. and having an indicated viscosity of ½ second) | 20 |
| Polyisocyanate (trade name "D-250N" of Takeda Chemical Industries Ltd.) | 4 |
| Copper Phthalocyanine | 5 |
| Stearic Acid | 1 |
| Methylethylketone | 120 |
| Toluene | 120 |
| Cyclohexane | 120 |

Manufacturing of Magnetic Recording Medium

Magnetic Coating Composition A was applied to a polyethylene terephthalate support having a thickness of 6 μm to have a dry thickness of 2.5 μm. In a state where the coating was in a wet state, the intermediate product was allowed to pass through a solenoid having a magnetic field of 5,000 Oe so that the magnetic field orientation was carried out. In a drying furnace to which hot air having a temperature of 60° C. to 100° C. was supplied at a wind velocity of 15 m/sec, the intermediate product was dried, and then it was wound. Then, a calender process was performed at 85° C. and a pressure of 300 kg/cm, so that a magnetic layer was formed. Then, the back coating composition was applied to the opposite side of the support to have a dry thickness of 0.6 μm, followed by performing a drying process at 90° C. and winding the intermediate product. Then, an aging process was performed at 50° C. for 16 hours, followed by cutting the obtained product to have a width of 3.81 mm. As a result, a magnetic recording tape having a width of 3.81 mm was obtained. The obtained tape was subjected to evaluations such that the decreasing ratio of the saturation flux density and the surface roughness of the magnetic layer, output (4.7 MHz) and storage durability (an error rate) were measured. The results are shown in Table 1.

Measuring Methods

Content of Water in Ferromagnetic Metal Powder

A micro water content measuring apparatus having an automatic water vaporizing apparatus and using a Karl Fischer technique was employed to measure the content of water.

9

Coercive Force and Saturation Flux Density

The support and the magnetic layer were punched to respectively have predetermined sizes, followed by using a vibration magnetometer to measure the coercive force and the saturation flux density at an applied magnetic field of 10 kOe.

Decreasing Ratio ΔBs of Saturation Flux Density of Magnetic Layer

Saturation flux density Bs' realized after the obtained magnetic tape was allowed to stand in an environment of the temperature of 60° C. and the relative humidity of 90% for 30 days, was measured by the foregoing measuring method. By using saturation flux density Bs (initial value) of the magnetic layer before storage, the decreasing ratio ΔBs was obtained by the equation ΔBs=(1−Bs'/Bs)×100.

Surface Roughness of Magnetic Recording Medium

Surface Roughness Ra

The surface roughness of the obtained magnetic recording medium was measured by using Laser Inter Ferometric Microscope Maxim 3D Model 5700 (which was trade name of Zygo), under condition of Fizeau 40 and Filter off. Assuming that the length of the sample was 180 μm and N was 260, the surface roughness Ra was calculated in accordance with the following Equation (1):

$$Ra = \frac{1}{L} \int_0^L |f(x)| dx \qquad (1)$$

Output (4.7 MHz)

The magnetic recording tape having a width of 3.81 mm was loaded into a DAT cassette so that a DAT tape cassette to be tested was obtained. The obtained test DAT tape cassette and Tape Evaluator Model 4500 (manufactured by Media Logic) were used to record 4.7 MHz signals. The outputs (reproduced outputs) were measured which were obtained when the signals were reproduced. Note that the recording wavelength of the signal having the frequency of 4.7 MHz was 0.67 μm. Reference tape RSD1079 was employed as the standard tape.

Storage Durability (Error Rate)

A DDS-1 drive was used to measure the block error rate of the obtained magnetic recording tape for the overall length of the tape except the B.O.T (Beginning of Tape) and E.O.T (End of Tape) each corresponding to 5 minutes. The obtained mean error rate was employed as the error rate in this evaluation (before storage). Also an error rate realized after storage in a high temperature and high humidity (60° C. and 90% RH) for 30 days was measured.

Example 2

A magnetic recording tape was manufactured in the same manner as in Example 1 except that the following Magnetic Coating Composition B was used in place of Magnetic Coating Composition A. The obtained magnetic recording tape was subjected to test in the same manner as in Example 1. The results are shown in Table 1.

Magnetic Coating Composition B

The same magnetic coating composition was employed except that the ferromagnetic metal powder for use in Magnetic Coating Composition A was replaced by the following ferromagnetic metal powder.

10

| | Parts by Weight |
|---|---|
| Ferromagnetic Metal Powder Mainly Composed of Fe Fe:Al:La:Co:Ca (a surface oxide layer was provided in which 2.5 parts by weight of La per 100 parts by weight of Fe was contained as the additive element, the coercive force was 1,600 Oe, the saturation magnetization was 132 emu/g, the mean length in the long axis was 0.22 μm, the acicular ratio was 11.5, the content of water was 1.1%, the thickness was 30 Å to 50 Å and the mean thickness was 40 Å) | 100 |

Comparative examples is described below. In each comparative example, a magnetic recording tape was manufactured in the same manner as in Example 1, and a magnetic recording tape serving as a magnetic recording medium and having a magnetic layer formed by the magnetic coating composition shown in Table 2 was used to measure the content of water contained in the ferromagnetic metal powder, the coercive force and the saturation flux density of the magnetic layer. The results are shown in Table 2.

Comparative Example 1

A magnetic recording tape was manufactured by using Magnetic Coating Composition A in the sane manner as in Example 1 except that the wind velocity was 30 m/sec and the drying process was performed such that the final drying temperature was raised to 120° C., that is, the drying operation was performed in a temperature range from 60° C. to 120° C. and the drying time was 75 sec to 85 sec. The obtained magnetic recording tape was subjected to test in the same manner as in Example 1. The results are shown in Table 2.

Comparative Example 2

A magnetic recording tape was manufactured in the same manner as in Example 1 except that the following Magnetic Coating Composition P was employed in place of Magnetic Coating Composition A. The obtained magnetic recording tape was subjected to test in the same manner as in Example 1. The results are shown in Table 2.

Magnetic Coating Composition P

Magnetic Coating Composition P was similar to the Magnetic Coating Composition A except that the ferromagnetic metal powder for use in Magnetic Coating Composition A was replaced by the following ferromagnetic metal powder.

| | Parts by Weight |
|---|---|
| Ferromagnetic Metal Powder Mainly Composed of Fe Fe:Al:Y:Co:Ca (a surface oxide layer was provided in which 1.8 parts by weight of Y per 100 parts by weight of Fe was contained as the additive element, the coercive force was 1,400 Oe, the saturation magnetization was 124 emu/g, the mean length in the long axis was 0.25 μm, the acicular ratio was 12, the content of water was 1.0%, the thickness was 20 Å to 30 Å and the mean thickness was 25 Å) | 100 |

Comparative Example 3

A magnetic recording tape was manufactured in the same manner as in Example 1 except that the following Magnetic Coating Composition Q was employed in place of Magnetic Coating Composition A. The obtained magnetic recording tape was subjected to test in the same manner as in Example 1. The results are shown in Table 2.

Magnetic Coating Composition Q

The ferromagnetic metal powder for use in Magnetic Coating Composition A was replaced by the following ferromagnetic metal powder.

|  | Parts by Weight |
|---|---|
| Ferromagnetic Metal Powder Mainly Composed of Fe Fe:Al:Y:Ca (a surface oxide layer was provided in which 1.6 parts by weight of Y per 100 parts by weight of Fe was contained as the additive element, the coercive force was 1,585 Oe, the saturation magnetization was 129 emu/g, the mean length in the long axis was 0.25 μm, the acicular ratio was 13, the content of water was 0.9%, the thickness was 5 Å to 15 Å and the mean thickness was 8 Å) | 100 |

Comparative Example 4

A magnetic recording tape was manufactured in the same manner as in Example 1 except that the following Magnetic Coating Composition R was employed in place of Magnetic Coating Composition A. The obtained magnetic recording tape was subjected to test in the same manner as in Example 1.

Magnetic Coating Composition R

The ferromagnetic metal powder for use in the Magnetic Coating Composition A was replaced by the following ferromagnetic metal powder.

|  | Parts by Weight |
|---|---|
| Ferromagnetic Metal Powder Mainly Composed of Fe Fe:Al:Y:Co:Ca (a surface oxide layer was provided in which 1.8 parts by weight of Y per to 100 parts by weight of Fe was contained as the additive element, the coercive force was 1,580 Oe, the saturation magnetization was 125 emu/g, the mean length in the long axis was 0.25 μm, the acicular ratio was 13, the content of water was 1.9%, the thickness was 30 Å to 50 Å and the mean thickness was 40 Å) | 100 |

As a result, the content of water in the magnetic powder was 1.6% or higher. Thus, the dispersion properties of the coating composition was deteriorated.

Comparative Example 5

A magnetic recording tape was manufactured in the same manner as in Example 1 except that the following Magnetic Coating Composition S was employed in place of Magnetic Coating Composition A. The obtained magnetic recording tape was subjected to test in the same manner as in Example 1. The results are shown in Table 2.

Magnetic Coating Composition S

The ferromagnetic metal powder for use in Magnetic Coating Composition A was replaced by the following ferromagnetic metal powder.

|  | Parts by Weight |
|---|---|
| Ferromagnetic Metal Powder Mainly Composed of Fe Fe:Al:Y:Co:Ca (a surface oxide layer was provided in which 1.8 parts by weight of Y per 100 parts by weight of Fe was contained as the additive element, the coercive force was 1,580 Oe, the saturation magnetization was 125 emu/g, the mean length in the long axis was 0.25 μm, the acicular ratio was 13, the content of water was 0.35%, thickness was 30 Å to 50 Å and the mean thickness was 40 Å) | 100 |

As a result, the content of water in the magnetic powder was 0.4% or lower. Thus, the dispersion properties of the coating composition was deteriorated.

Comparative Example 6

A magnetic recording tape was manufactured in the same manner as in Example 1 except that the following Magnetic Coating Composition T was employed in place of Magnetic Coating Composition A. The obtained magnetic recording tape was subjected to test in the same manner as in Example 1. The results are shown in Table 2.

Magnetic Coating Composition T

The ferromagnetic metal powder for use in Magnetic Coating Composition A was replaced by the following ferromagnetic metal powder.

|  | Parts by Weight |
|---|---|
| Ferromagnetic Metal Powder Mainly Composed of Fe Fe:Al:Co:Ca (a surface oxide layer was provided in which any element in group IIIa is not contained as the additive element, the coercive force was 1,580 Oe, the saturation magnetization was 125 emu/g, the mean length in the long axis was 0.25 μm, the acicular ratio was 13, the content of water was 1.0%, the thickness was 10 Å to 20 Å and the mean thickness was 15 Å) | 100 |

TABLE 1

|  | Examples | |
|---|---|---|
|  | 1 | 2 |
| Magnetic Coating Composition | A | B |
| Magnetic Layer |  |  |
| Surface Roughness Ra (nm) | 6.8 | 6.3 |
| Coercive Force (Oe) | 1590 | 1610 |
| Saturation Flux Density (G) | 3690 | 3780 |
| ΔBs (%) | 4.3 | 7 |
| Content of Water in Ferromagnetic Metal powder (wt %) | 0.9 | 1.1 |
| Additive Elements to Ferromagnetic Metal powder | Y | La |
| Quantity of Addition (parts by weight) (per 100 parts by weight of Fe) | 1.8 | 2.5 |
| Output (4.7 MHz) (dB) | −0.8 | −0.7 |
| Storage Durability |  |  |
| Before Storage/Error Rate | $5.0 \times 10^{-5}$ | $4.5 \times 10^{-5}$ |
| After Storage/Error Rate | $1.9 \times 10^{-4}$ | $1.6 \times 10^{-5}$ |

TABLE 2

|  | Comparative Examples | | | | | |
| --- | --- | --- | --- | --- | --- | --- |
|  | 1 | 2 | 3 | 4 | 5 | 6 |
| Magnetic Coating Material | A | P | Q | R | S | T |
| Magnetic Layer | | | | | | |
| Surface roughness Ra (nm) | 15 | 6.8 | 6.1 | 17 | 18 | 9.5 |
| Coercive Force (Oe) | 1590 | 1430 | 1585 | 1590 | 1595 | 1585 |
| Saturation flux density (G) | 3610 | 3505 | 3580 | 3660 | 3610 | 3620 |
| ΔBs (%) | 6.8 | 12.0 | 13.0 | 9.6 | 9.1 | 15 |
| Content of Water in Ferromagnetic Metal Powder (wt %) | 0.9 | 1 | 0.9 | 1.9 | 0.35 | 1 |
| Additive Elements in Ferromagnetic Metal Powder | Y | Y | Y | Y | Y | — |
| Quantity of Addition (parts by weight) (per 100 parts by weight of Fe) | 1.8 | 1.8 | 1.6 | 1.8 | 1.8 | — |
| Output (4.7 MHz) (dB) | −3.8 | −1.3 | −1.9 | −3.9 | −3.0 | −1.8 |
| Storage Durability | | | | | | |
| Before Storage/Error Rate | NG | $1.0 \times 10^{-4}$ | $3.5 \times 10^{-4}$ | NG | NG | $3.0 \times 10^{-4}$ |
| After Storage/Error Rate | NG | $2.0 \times 10^{-3}$ | $4.8 \times 10^{-3}$ | NG | NG | $2.0 \times 10^{-3}$ |

Note)
NG means that measurement could not be performed.

As is apparent from the results of Tables 1 and 2, the magnetic recording medium according to the present invention, having the surface roughness and the coercive force of the magnetic layer and the decreasing ratio of the saturation flux density satisfying the foregoing ranges, exhibits excellent electromagnetic characteristics. Moreover, the electromagnetic characteristics are not deteriorated during storage (storage in a raw fabric, storage of a pan cake state manufactured by cutting and storage in a cassette state included). Thus, it is clearly seen that the magnetic recording medium according to the present invention exhibits excellent storage stability.

As described above, the magnetic recording medium according to the present invention has excellent electromagnetic characteristics and storage stability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising:

a support and a magnetic layer comprising a ferromagnetic metal powder and a binder formed on said support, wherein said magnetic layer has a surface roughness of 10 nm or smaller, a coercive force of more than 1,580 Oe and a decreasing ratio ΔBs of a saturation flux density which is a change rate of saturation flux density Bs' of said magnetic layer realized after said magnetic recording medium has been allowed to stand in an environment, the temperature of which is 60° C. and the relative humidity of which is 90% for 30 days, as compared with saturation flux density Bs of said magnetic layer before said magnetic recording medium is allowed to stand, the change rate being a value expressed by an equation ΔBs=(1−Bs'/Bs)×100 of 10% or lower, wherein a content of water in said ferromagnetic metal powder is 0.4 wt % to 1.6 wt;

said ferromagnetic metal powder is a ferromagnetic metal powder containing one or more elements in Group IIIa including lanthanoids in an amount of 0.8 to 20 parts by weight per 100 parts by weight of Fe atoms; and a saturation magnetization of said ferromagnetic metal powder is 125 emu/g to 180 emu/g.

2. A magnetic recording medium as in claim 1, wherein the coercive force of said magnetic layer is 1,600 Oe to 2,400 Oe.

3. The magnetic recording medium of claim 1, wherein said ferromagnetic metal powder is a ferromagnetic metal powder containing one or more elements selected from the group consisting of Sc, Y, La, Nd, Sm, Dy, Gd, Ce, Pr and Tb.

4. The magnetic recording medium of claim 1, wherein said support comprises a polymer resin selected from the group consisting of polyethylene terphthalate, polybutylene terphthalate, polyethylene naphthalate, polycyclohexylene dimethylene terphthalate, polyethylene bisphenoxycarboxylate, polyethylene, polypropylene, cellulose acetate butyrate, cellulose acetate propionate, polyvinyl chloride, polyvinylidine chloride, polyamide, polyimide, polycarbonate, polysulfone, polyether ether ketone, polyurethane and a mixture thereof.

5. The magnetic recording medium of claim 1, wherein a saturation flux density of said ferromagnetic metal powder is 2,500 to 4,500 gauss.

6. The magnetic recording medium of claim 1, wherein a saturation flux density of said ferromagnetic metal powder is 2,800 to 4,000 gauss.

7. The magnetic recording medium of claim 1, wherein said ferromagnetic metal powder has a length in the long axis of 0.05 to 0.30 μm.

8. The magnetic recording medium of claim 1, wherein said ferromagnetic metal powder has an acicular shape and an acicular ratio of 3 to 20.

9. The magnetic recording medium of claim 1, wherein said ferromagnetic metal powder has a particle size as analyzed by x-ray of 130 to 250 Å.

10. The magnetic recording medium of claim 1, wherein said magnetic layer has a thickness of 0.05 to 3.0 μm.

11. The magnetic recording medium of claim 1, wherein said magnetic layer has a decreasing ratio ΔBs of a saturation flux density of 0.05 to 8%.

12. The magnetic recording medium of claim 1, wherein said ferromagnetic metal powder comprises, Fe, Al, Y, Co and Ca, an amount of Y in a surface oxide layer being 1.8 parts by weight per 100 parts by weight of Fe.

* * * * *